US008403225B2

(12) United States Patent
Sharra et al.

(10) Patent No.: US 8,403,225 B2
(45) Date of Patent: Mar. 26, 2013

(54) VEHICLE LICENSE PLATE INDICIA SCANNING

(75) Inventors: Ronda D. Sharra, Red Creek, NY (US); Richard A. Romanchik, Rochester, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 197 days.

(21) Appl. No.: 11/601,484

(22) Filed: Nov. 17, 2006

(65) Prior Publication Data
US 2008/0116282 A1 May 22, 2008

(51) Int. Cl.
G06K 7/10 (2006.01)
(52) U.S. Cl. ............. 235/472.01; 235/470; 235/462.45; 235/462.24
(58) Field of Classification Search ............. 235/472.01, 235/494, 384, 468; 713/180, 189, 176; 340/937, 340/572.1, 541; 382/104; 348/118
See application file for complete search history.

(56) References Cited

U.S. PATENT DOCUMENTS

| | | | | |
|---|---|---|---|---|
| 6,616,049 B1 * | 9/2003 | Barkan et al. | ............. | 235/472.03 |
| 6,832,728 B2 * | 12/2004 | Kennedy | ........................ | 235/468 |
| 6,982,654 B2 * | 1/2006 | Rau et al. | ........................ | 340/937 |
| 7,222,236 B1 * | 5/2007 | Pagel | ........................ | 713/176 |
| 7,281,662 B2 * | 10/2007 | He et al. | .................... | 235/462.42 |
| 7,343,195 B2 * | 3/2008 | Strommer et al. | ............ | 600/424 |
| 7,504,965 B1 * | 3/2009 | Windover et al. | ............. | 340/937 |
| 2002/0186297 A1 * | 12/2002 | Bakewell | ........................ | 348/118 |
| 2003/0062418 A1 * | 4/2003 | Barber et al. | ............ | 235/462.45 |
| 2004/0094621 A1 * | 5/2004 | LaMont | ........................ | 235/384 |
| 2004/0165750 A1 * | 8/2004 | Chew | ........................ | 382/105 |
| 2004/0199778 A1 * | 10/2004 | Wernet et al. | ........................ | 713/189 |
| 2004/0207526 A1 * | 10/2004 | Liao et al. | ........................ | 340/572.1 |
| 2005/0173524 A1 * | 8/2005 | Schrader | ........................ | 235/384 |
| 2006/0047371 A1 * | 3/2006 | Janssen | ........................ | 701/1 |
| 2006/0095778 A1 * | 5/2006 | He et al. | ........................ | 713/180 |
| 2007/0009136 A1 * | 1/2007 | Pawlenko et al. | ............ | 382/104 |
| 2007/0036599 A1 * | 2/2007 | Piersol et al. | ................... | 400/76 |
| 2007/0208681 A1 * | 9/2007 | Bucholz | ........................ | 706/47 |
| 2007/0250232 A1 * | 10/2007 | Dourney et al. | ................ | 701/35 |
| 2009/0072972 A1 * | 3/2009 | Pederson | ...................... | 340/541 |
| 2011/0303750 A1 | 12/2011 | Wang | | |
| 2012/0248196 A1 | 10/2012 | Wang | | |

FOREIGN PATENT DOCUMENTS
WO  WO/2006098954 A2  9/2006

OTHER PUBLICATIONS

U.S. Appl. No. 13/213,543, Amendment After Final Action Under 37 C.F.R. 1.116 dated Jan. 22, 2013.
U.S. Appl. No. 13/493,348, Amendment in Response to Non-Final Office Action Under 37 C.F.R. 1.111 dated Jan. 17, 2013.

* cited by examiner

*Primary Examiner* — Thien M Le
*Assistant Examiner* — Sonji Johnson
(74) *Attorney, Agent, or Firm* — Heslin Rothenberg Farley & Mesiti P.C.

(57) ABSTRACT

A method of reading information bearing indicia comprising the steps of: scanning indicia on a vehicular license plate utilizing an indicia reader; decoding the data; and, utilizing the decoded data to retrieve information regarding the vehicle and/or vehicle operator from a remote database.

15 Claims, 3 Drawing Sheets

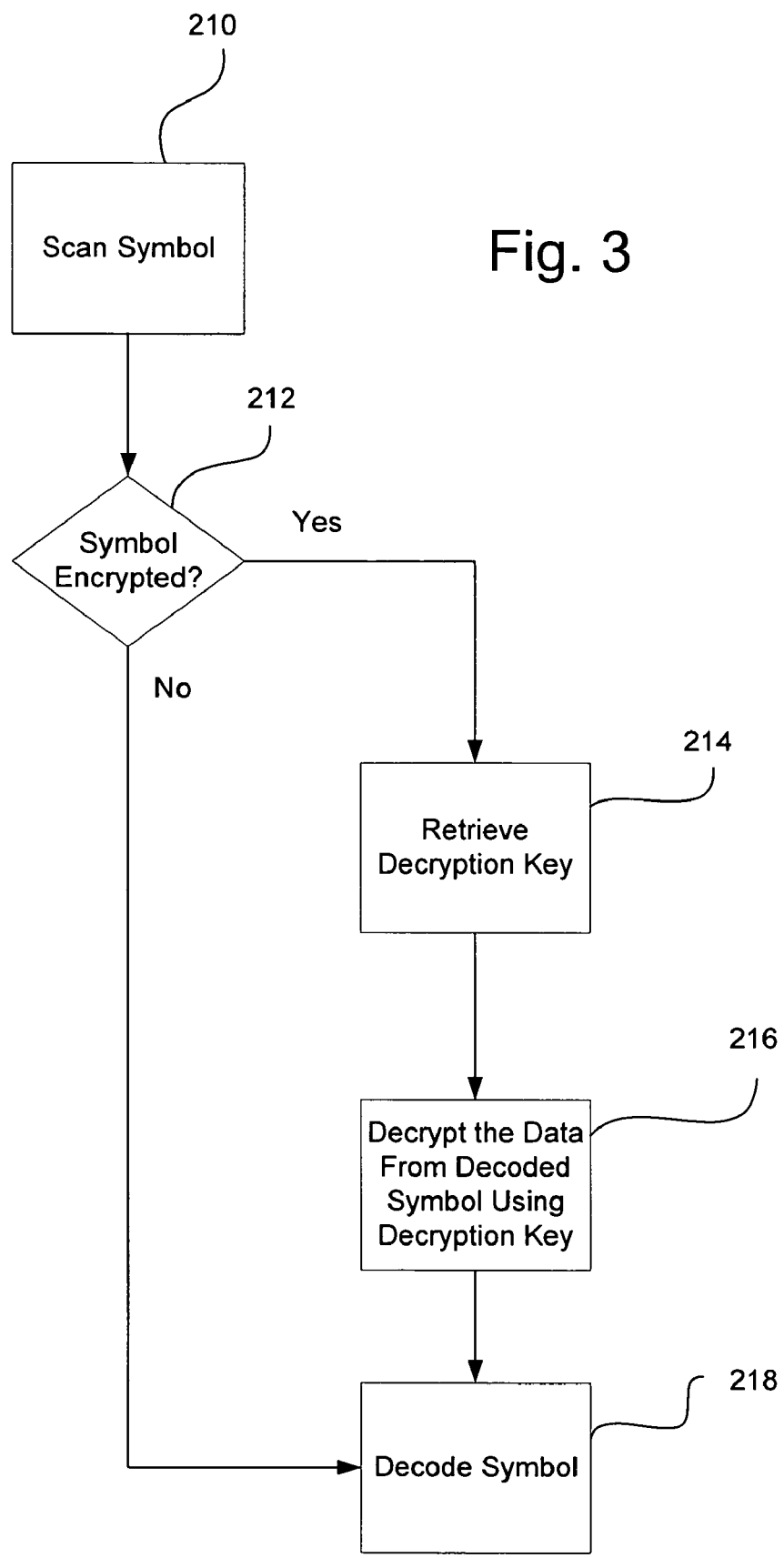

VEHICLE LICENSE PLATE INDICIA SCANNING

FIELD OF THE INVENTION

The present invention relates to indicia devices in general, and more particularly, to reading indicia on vehicle license plates.

BACKGROUND

In various environments, the use of information bearing indicia, such as bar code symbols, has become the norm for identifying products and inventory. Typically, each item is marked with information bearing indicia associated with a description of the item and other attributes (for example, price or patient identification) that are stored in a database of a host device or network system. Indicia readers are used to read the indicia and provide that reading as input information to host devices.

Efforts regarding such systems have led to continuing developments to improve their versatility, practicality and efficiency.

BRIEF DESCRIPTION OF THE DRAWINGS

FIG. 3 is a flow chart of a method of operating an indicia reader system in accordance with the present invention.

DETAILED DESCRIPTION

Figure 1:
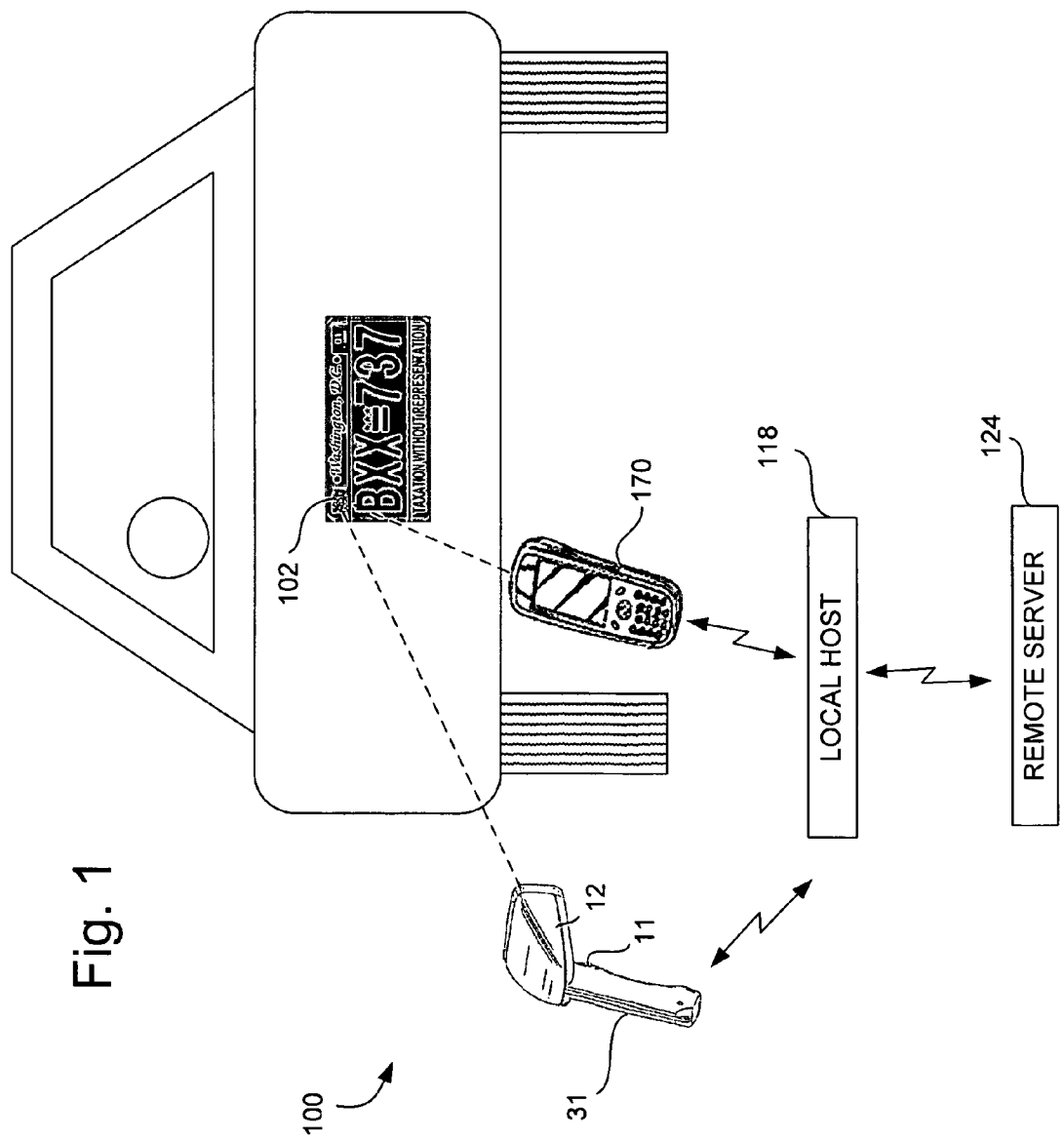
FIG. 1 is an illustration of an exemplary indicia reading system in accordance with the present invention.

Reference will now be made in detail to the present preferred embodiments of the invention, examples of which are illustrated in the accompanying drawings. Whenever possible, the same reference numerals will be used throughout the drawings to refer to the same or like parts for clarity.

FIG. 1 illustrates an exemplary indicia reader system 10 which includes a reader 12. The reader 12 may have a handle 31 for hand held operation. The reader 12 may be any device capable of reading a target with information bearing indicia 102, such as bar code symbols, including linear, two dimensional, and matrix, and may be in the form of a scanner or imager. Examples of indicia include PDF417, MicroPDF417, MaxiCode, Data Matrix, QR Code, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, KIX (Netherlands) Post, OCR-A, OCR-B, Code 11, UPC, EAN, MSI, Code 16K, etc. The indicia reader may be a portable data terminal (PDT) 170, personal digital assistant (PDA), or similar device. A trigger 11 may be used for controlling full or partial operation of the reader 12.

Information read by the reader 12 from the indicia 102 may be communicated to a host device or processor 118.

Figure 2:
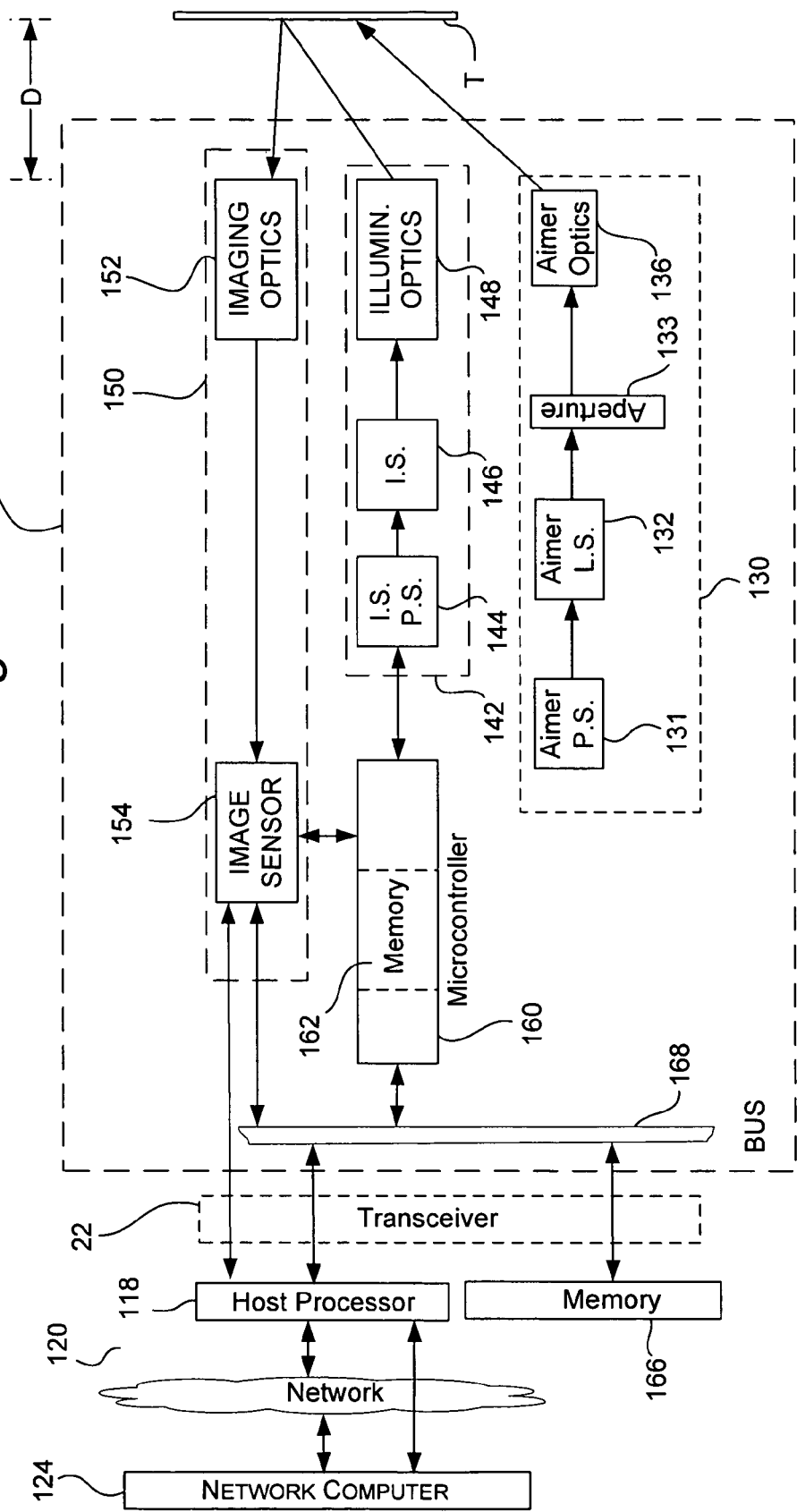
FIG. 2 is a schematic block diagram of an exemplary imaging module in accordance with the present invention.

Referring to FIG. 2, reader 12 may have a number of subsystems including an imaging module subassembly provided within a head portion or housing of reader 12. Imaging module subassembly 13 may have an aiming pattern generator 130, an illumination generator 142, an imaging system 150 and a microcontroller 160.

An exemplary aiming pattern generator 130 may be adapted to generate an aiming pattern for assisting an operator to align target T coincident with the field of view of an imaging system 150. Aiming pattern generator 130 may include a power supply 131, light source 132, aperture 133 and optics 136 to create an aiming light pattern projected on or near the target which spans a portion of the receive imaging system 150 optical system 152 operational field of view with the intent of assisting the operator to properly aim the scanner at the target T indicia that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source(s) 132 may comprise any light source to provide a desired illumination pattern at the target and may be one or more LEDs 134, such as part number NSPG300A made by Nichia Corporation.

The light beam from the LEDs 132 may be directed towards an aperture 133 located in close proximity to the LEDs. An image of this back illuminated aperture 133 may then be projected out towards the target location with aimer optics 136, such as a lens. The lens may be a spherically symmetric lens, an aspheric lens, a cylindrical lens or an anamorphic lens with two different radii of curvature on their orthogonal lens axis.

Alternately, the aimer pattern generator may be a laser pattern generator. The light sources 132 may also be comprised of one or more laser diodes such as those available from Rohm. In this case a laser collimation lens (not shown) will focus the laser light to a spot generally forward of the reader and approximately at the plane of the target T. This beam may then be imaged through a diffractive interference pattern generating element, such as a holographic element fabricated with a desired pattern. Examples of these types of elements may be available for example, from Digital Optics Corp. of Charlotte, N.C. among others. Elements of these types are described in U.S. Pat. Nos. 4,895,790 (Swanson); 5,170,269 (Lin et al) and 5,202,775 (Feldman et al), which are hereby incorporated herein by reference.

Image reader may include an illumination assembly 142 for illuminating target area T. Illumination assembly 142 may also include one or more power supplies 144, illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Image sensor 154 may be a two dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed. An exemplary CMOS sensor is model number MT9V022 from Micron Technology Inc.

Further description of image sensors is provided in commonly owned U.S. patent application Ser. No. 11/077,995 entitled "BAR CODE READING DEVICE WITH GLOBAL ELECTRONIC SHUTTER CONTROL" filed on Mar. 11, 2005, which is hereby incorporated herein by reference in it's entirety.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

In exemplary configurations considered herein the aimer illumination sources are not operated during the exposure period of the image sensor.

Features and advantages associated with incorporating a color image sensor in an imaging device, and other control features which may be incorporated in a control circuit are discussed in greater detail in U.S. Pat. No. 6,832,725 entitled "An Optical Reader Having a Color Imager" incorporated herein by reference. It is to be noted that the image sensor 154 may read images with illumination from a source other than illumination source 146, such as from a source located remote from the reader.

The output of the image sensor may be processed utilizing one or more functions or algorithms to condition the signal appropriately for use in further processing downstream, including being digitized to provide a digitized image of target T.

Microcontroller 160, may perform a number of functions, such as controlling the amount of illumination provided by illumination source 146 by controlling the output power provided by illumination source power supply 144. Microcontroller 160 may also control other functions and devices. An exemplary microcontroller 160 is a CY8C24223A made by Cypress Semiconductor Corporation, which is a mixed-signal array with on-chip controller devices designed to replace multiple traditional MCU-based system components with one single-chip programmable device. It may include configurable blocks of analog and digital logic, as well as programmable interconnects. Microcontroller 160 may include a predetermined amount of memory 162 for storing data.

The components in reader 12 may be connected by one or more bus 168 or data lines, such as an Inter-IC bus such as an $I^2C$ bus, which is a control bus that provides a communications link between integrated circuits in a system. This bus may connect to a host processor, on or off the same printed circuit board as used by the imaging device either through a wire or wireless method. $I^2C$ is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

An exemplary imaging system 100 may include a reader 12 in communication with a host device or processor 118. This host processor may be in communication with a network 120 which may be connected to one or more network computer or remote server 124.

The functional operation of the host processor 118 involves the performance of a number of related steps, the particulars of which may be determined by or based upon certain parameters stored in memory 166 which may be any one of a number of memory types such as RAM, ROM, EEPROM, etc. In addition some memory functions may be stored in memory 162 provided as part of the microcontroller 160. One of the functions of the host processor 118 may be to decode machine readable symbology provided within the target or captured image.

Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

Operation of the decoding, which may be executed in a user or factory selectable relationship to a scanning routine, may be governed by parameters which are enabled for processing as a part of an autodiscrimination process, whether decoding is to be continuous or discontinuous, etc. Permitted combinations of scanning and decoding parameters together define the scanning-decoding relationships or modes which the reader will use. In the continuous mode (also referred to as continuous scanning mode, continuous streaming mode, streaming mode, fly-by scanning mode, on the fly scanning mode or presentation mode) the reader is held in a stationary manner and targets (such as symbols located on packages) are passed by the reader 12. In the continuous mode, the reader takes continuous image exposures seriatim and continuously decodes or attempts to decode some or all of these images. In the continuous mode exposure times and decoding times may be limited.

Discontinuous or manual mode is a mode wherein scanning and/or decoding stops or is interrupted and initiated with an actuation event, such as pulling of a trigger 11, to restart. An exemplary utilization of the reader in discontinuous mode is via hand held operation. While triggered, the image reader may expose images continuously and decode images continuously. Decoding stops once the image reader is no longer triggered. Exposing of images however, may continue. In the discontinuous mode, the exposure time, decoding time out limits and decoding aggressiveness may be increased more than those set for continuous mode. The discontinuous mode is typically initiated because the operator knows a symbol is present. The decoder therefore may forego making a determination of the presence of a symbol because a symbol is presumed to be in the field of view. Discontinuous mode may provide longer range scanning than the continuous mode.

Switching between continuous and discontinuous modes may be accomplished by use of a trigger 11 located on the reader. For example, when the trigger is depressed by an operator the reader may operate in a discontinuous mode and when the trigger is released the reader may switch to continuous mode after a predetermined period of time. A scanning subroutine may specify an address buffer space or spaces in which scan data is stored and whether scanning is to be continuous or discontinuous.

Another example of switching between continuous and discontinuous modes may be accomplished by symbology wherein switching between the modes depends on the type of symbology detected. The reader may stop attempting to decode a symbol after a predetermined time limit. The reader may limit the type of symbols to decode when in the continuous mode.

The aiming pattern generator may be programmed to operate in either continuous or discontinuous modes.

In the continuous mode, the present device may be configured to automatically switch to a reduced power state if no symbol has been sensed for a period of time. Upon sensing of a symbol the scanner may then automatically switch back to the higher power state continuous mode. In this reduced power state the scanner may change from having the aimer and/or illumination light sources on for every scan to having either/or on for only some of the scans (e.g. every 2 or 3 or less scans). In this manner the system may still be in a position to sense the presence of a symbol, but will draw less current and also generate less internal heating. After sensing a symbol, the image reader may utilize aiming/illumination for every scan until another period of inactivity is sensed.

Mode changes may be accomplished by the local host processor in response to an appropriate signal over either a direct connection or wireless connection to the scanner.

Referring to FIG. 1, reader 12 may be used as part of a scanning system or indicia reader network 100. In an exemplary indicia reader network 100 a reader 12 scans an item's 102 information bearing indicia 102 located on a vehicle's state license plate. The reader output signal of information contained in the indicia is wirelessly communicated to a local host 118 which may decode the data message for further processing. The local host may be located in a relatively close proximity, such as toll booth or another vehicle, such as police or other governmental agency vehicle. The local host 118 may communicate decoded indicia data message to a remote server 124. The remote server 124 may perform a variety of functions and responsibilities, such as decoding, accessing information to compare the indicia information against information in government databases such as motor vehicle departments, customs, the justice department, the BATF, police departments, etc. The information retrieved from the databases may be vehicle or operator registration information, driving or other records. The remote server may be linked to another remote server or computer so that another person may provide remote help or service. The remote server may reference a third party database, cull information, make comparisons and determinations, alert establishment personnel and security, etc. and send back a result. The remote server may also record the information to another database for record keeping purposes. The indicia may be located in other locations on the license plate or vehicle than the location shown in FIG. 1.

If the indicia reader is an optical reader, it may take an archival picture of the vehicle, operator, or passengers which may be saved by the remote server. Information read from indicia or the picture taken may be used to electronically complete various types of forms, such as traffic tickets, statutorily required forms, etc. The process of extracting the information from the picture might include OCR, 2D barcode decoder such as PDF417 decoder, or matrix decoder such as Datamatrix, Aztec, QR code decoder, etc.

Multiple indicia may be provided on the license plate in order to provide the capacity to read more information that is allowable in a singular indicia.

In another example, the scanner might read the vehicle operator's information from the indicia (such as a PDF417 bar code) on the operator's driver's license. The information may then be compared with information associated with the indicia on vehicle license plate. Information from the operator driver license may also be utilized to populate forms, such as traffic tickets, statutorily required forms, etc. Such a system would be more convenient while at the same time reducing time and reducing application error rate because of incorrectly transcribed information. At the same time the scanner may be automatically changed to a picture taking mode, signal the operator to aim the scanner at the applicant, the driver's license, etc. and then take a picture. This picture could then also be automatically added to or associated with a roadside transaction or stop, at toll booths, customs checkpoints, military checkpoints, airports, etc.

The reader 12 may include a wireless transceiver 22, such as, for example a wireless Bluetooth, IEEE 802.11b, ZigBee, or other standardized or proprietary RF device which may be configured to provide communications between the reader 12 and the local host 118. The wireless transceiver 22 may consist of an RF module and antenna (not shown) and is configured to engage in two-way communication with at least one other wireless transceiver. Another wireless transceiver may be located in the local host 118, which may be a stand-alone unit or physically incorporated into another host device such as a computer or similar device. The wireless transceiver 22 may include a RF module and an antenna. The wireless transceiver 22 may transmit decoded information to a wireless transceiver in the local host 118 for secure transactions. The wireless communication protocol may be according to a secure protocol, such as the FIPS 140-2 standard.

The wireless device 10 may be configured for operation in a hostile environment and may be hermetically sealed units.

Information bearing devices may contain sensitive information such as component specifications, recipes or process data in a production environment, personal records, medical information in healthcare, social security numbers, biometrics, entrance and access keys, ticketing applications, vouchers for discount in retail or the information bearing devices may be involved in transactions involving financial or private information. In these type of applications the data is generally at risk from being misused and/or to perform criminal activity. A scanning system with security features may reduce such risks. For these applications it may be required that the data in an information bearing indicia be encrypted, wherein the information bearing indicia can be read, but the data in the information bearing indicia is encrypted. Encryption is the conversion of data into a form that cannot be easily understood by unauthorized people. A decrypting algorithm would be required to decrypt such data. Decryption is the process of converting encrypted data back into its original form, so it can be understood. Operation of the decrypting algorithm requires the use of a "key". Encryption key(s) may be secret keys, private keys, or public keys. This encryption key may be provided in the scanner firmware, the host device, in the encrypted barcode or in a separate barcode, which allows the user to decide whether to separate the encryption key from the data or combine them. Encryption keys may be associated by mathematical derivation, symmetry, or other relationship. Encryption keys may updated by pushing the key to the scanner from the host device, or by scanner to scanner communication as discussed hereinbefore.

For example, the scanner may be able to recognize the information bearing indicia as an encrypted information bearing indicia by recognizing a unique unencrypted piece of a data string provided within the information bearing indicia. That same piece of data may also instruct the scanner where to look for the encryption key.

The information bearing indicia may be partially encrypted, which may allow the user only to read an unencrypted part of the information bearing indicia with any scanner. A data formatter may be utilized to strip encrypted data portions before further processing. If the encryption key matches the encrypted information bearing indicia and decoding is completed, the scanner will successfully "read" the data in the information bearing indicia.

If a mismatch between encryption key and information bearing indicia is noticed the scanner may have a "encryption protected" routine with a different sequence of led blinking/beeps, different from an unsuccessful scanner read type situation.

Referring to FIG. 3, a method of reading a information bearing indicia having encrypted data provided therein may comprise the steps of: scanning indicia utilizing an indicia reader (210); recognizing the presence of encrypted data in the indicia (212); retrieving an appropriate encryption key for decrypting the encrypted data (214); decrypting the data utilizing the encryption key (216); and decoding the decrypted data (218). If there is no encrypted data in the indicia it is simply decoded.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

The invention claimed is:

1. An indicia reading system comprising: a hand held indicia reader adapted for scanning a bar code, including a bar code located on a vehicular license plate and automatically signaling an operator of the indicia reader to aim the reader to take an image of a vehicle operator or any passengers; a host device for decoding bar code data; and, a remote server for utilizing the decoded data to retrieve information regarding the vehicle operator, sending the retrieved information to the host device with the archival image and storing the archival image.

2. An indicia reading system in accordance with claim 1, wherein the indicia reader is at least one of the following: a laser scanner; and an optical indicia reader.

3. An indicia reading system in accordance with claim 1, wherein the scanning is performed at a roadside point.

4. A system in accordance with claim 3, wherein the decoded data is utilized for electronic forms completion at the roadside point.

5. An indicia reading system adapted for decoding bar codes, including a bar code located on a vehicular license plate comprising: a hand held indicia reader for scanning a bar code on a vehicular license plate and taking an image of a vehicle operator; a host device in relatively close proximity to the indicia reader for receiving data over a wireless communication link from the indicia reader and for decoding the bar code; and, a first remote server for utilizing the decoded data to retrieve information regarding the operator and sending the retrieved information to the host device and sending the retrieved information with the image of the vehicle operator to a second remote server wherein the hand held indicia reader automatically signals an operator of the indicia reader to aim the reader and take an image of the vehicle operator or any passengers.

6. An indicia reading system in accordance with claim 5, wherein the image capture is performed at a roadside point.

7. An indicia reading system in accordance with claim 6, wherein the decoded data is utilized for forms completion at the roadside point.

8. An indicia reading system in accordance with claim 5, wherein archiving is for at least one of the following: statutory requirements; future identification; process compliance; and forms completion.

9. An indicia reading system in accordance with claim 5, wherein the indicia reader comprises an image sensor and further comprising the step of operating the image sensor in a full frame exposure mode.

10. An indicia reader system in accordance with claim 5 wherein the reader has the ability to send a signal to an operator of the reader to aim the reader at a specific object.

11. An indicia reader system in accordance with claim 5 wherein the reader has a wireless connection with the host device.

12. The indicia reading system set forth in claim 5 wherein the second remote server alerts a remote person who may provide help or perform a service for an individual operating the hand held indicia reader.

13. The indicia reading system set forth in claim 5 wherein the second remote server records the retrieved information regarding the vehicle operator.

14. A method of reading a bar code comprising the steps of: scanning a bar code on a vehicular license plate utilizing a hand held indicia reader and providing data representative thereof; decoding the bar code to provide decoded data; utilizing the decoded data to retrieve information regarding a vehicle operator from a database; utilizing the hand held indicia reader to take an image of the vehicle operator; and, saving the image of the vehicular operator with the decoded data at a remote server; wherein the hand held indicia reader automatically signals an operator of the indicia reader to aim the reader and take an archival image of the vehicle operator or any passengers.

15. A method of reading information bearing indicia in accordance with claim 14, further comprising extracting OCR information from the archival image.

* * * * *